(12) United States Patent
Kline et al.

(10) Patent No.: US 11,027,686 B2
(45) Date of Patent: Jun. 8, 2021

(54) VEHICLE-ASSOCIATED CONTROL SYSTEM TO SAFEGUARD AN OCCUPANT TO DEPART THE VEHICLE

(71) Applicant: INTERNATIONAL BUSINESS MACHINES CORPORATION, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 173 days.

(21) Appl. No.: 16/124,402

(22) Filed: Sep. 7, 2018

(65) Prior Publication Data

US 2020/0079310 A1 Mar. 12, 2020

(51) Int. Cl.
| | |
|---|---|
| *B60R 21/12* | (2006.01) |
| *G01C 21/34* | (2006.01) |
| *B60R 25/33* | (2013.01) |
| *B60R 25/01* | (2013.01) |

(52) U.S. Cl.
CPC ............. *B60R 21/12* (2013.01); *B60R 25/01* (2013.01); *B60R 25/33* (2013.01); *G01C 21/3461* (2013.01)

(58) Field of Classification Search
CPC ......... B60R 21/12; B60R 25/33; B60R 25/01; G01C 21/3461
See application file for complete search history.

(56) References Cited

U.S. PATENT DOCUMENTS

| | | | |
|---|---|---|---|
| 10,507,829 B2* | 12/2019 | Newman | ............... B60W 10/20 |
| 2014/0309885 A1 | 10/2014 | Ricci | |
| 2017/0138108 A1 | 5/2017 | Kothari | |
| 2017/0218678 A1* | 8/2017 | Kothari | ................... E05F 15/73 |
| 2017/0241184 A1 | 8/2017 | Rust | |
| 2018/0136656 A1* | 5/2018 | Rasmusson, Jr. | .... G05D 1/0246 |

FOREIGN PATENT DOCUMENTS

WO WO 2017/097213 A1 6/2017

OTHER PUBLICATIONS

Mel, et al., "The NIST Definition of Cloud Computing," National Institute of Standards and Technology, Information Technology Laboratory, Special Publication 800-145, Sep. 2011, (pp. 1-7).

* cited by examiner

*Primary Examiner* — Aniss Chad
*Assistant Examiner* — Chase L Cooley
(74) *Attorney, Agent, or Firm* — Tihon Poltavets, Esq.; Kevin P. Radigan, Esq.; Heslin Rothenberg Farley & Mesiti P.C.

(57) ABSTRACT

Vehicle-associated control system is provided to facilitate safeguarding an occupant to depart the vehicle. The control system receives situational data on an area outside the vehicle relevant to departure of the occupant from the vehicle, and based, at least in part, on the situational data, determines a risk level for the passenger to depart the vehicle in the area. Based on the determined risk level for the occupant to depart the vehicle in the area, the control system triggers a safeguard action to facilitate protecting the occupant.

14 Claims, 12 Drawing Sheets

TYPES OF SITUATIONAL INFORMATION ⟵ 410

A. ENVIRONMENTAL INFORMATION
- AIR QUALITY
  - POISONOUS OR TOXIC FUMES
  - PARTICULATE COUNT
- EARTHQUAKE
- WEATHER-RELATED
  - HURRICANE
  - TORNADO
  - THUNDER/LIGHTENING

B. SAFETY/SECURITY INFORMATION
- TRAFFIC
  - OTHER VEHICLES, BIKES APPROACHING
- THREATENING ANIMAL, OBJECT
  - TYPE OF ANIMAL
    - WOLF, BEAR, SNAKE
    - POISONOUS INSECT
    - DISEASE PRONE AREA

C. PHYSICAL LOCATION RELATED INFORMATION
- CLIFF OR RAVINE AT SIDE OF VEHICLE
- FLOODING ADJACENT TO VEHICLE
- POTENTIALLY HARMFUL OBSTRUCTION (OPTIONALLY OCCUPANT DEPENDENT - e.g., YOUNG OR ELDERLY INDIVIDUAL, HANDICAPPED INDIVIDUAL)

D. ACCIDENT-RELATED INFORMATION
- INJURY TO OCCUPANT
- DAMAGE TO VEHICLE

FIG. 4B

TYPES OF AUTOMATIC SAFEGUARD ACTIONS

- CONTROL OPENING/CLOSING OF VEHICLE DOOR(S)/WINDOW(S)
- PROVIDE NOTIFICATION(S)/ALERT(S) TO DEPARTING OCCUPANT
- PROVIDE RECOMMENDATION(S) TO DEPARTING OCCUPANT
- MOVE VEHICLE TO A NEARBY SAFER LOCATION
- CALL FOR EXTERNAL ASSISTANCE FOR THE OCCUPANT

SAFEGUARDING AN OCCUPANT TO DEPART A VEHICLE BY:

ASSOCIATING A CONTROL SYSTEM WITH THE VEHICLE, THE CONTROL SYSTEM:

- RECEIVING SITUATIONAL DATA ON AN AREA OUTSIDE THE VEHICLE RELEVANT TO DEPARTURE OF THE OCCUPANT FROM THE VEHICLE;

- DETERMINING A RISK LEVEL FOR THE OCCUPANT TO DEPART THE VEHICLE IN THE AREA, THE DETERMINING BEING BASED, AT LEAST IN PART, ON THE SITUATIONAL DATA; AND

- TRIGGERING A SAFEGUARD ACTION BY THE CONTROL SYSTEM BASED ON THE DETERMINED RISK LEVEL FOR THE OCCUPANT TO DEPART THE VEHICLE IN THAT AREA — 500

WHERE THE SAFEGUARD ACTION INCLUDES INHIBITING BY THE CONTROL SYSTEM OPENING OF A VEHICLE DOOR BASED ON THE RISK LEVEL EXCEEDING A DEFINED THRESHOLD — 505

WHERE THE SAFEGUARD ACTION INCLUDES NOTIFYING BY THE CONTROL SYSTEM THE OCCUPANT OF THE RISK LEVEL TO THE OCCUPANT IN DEPARTING THE VEHICLE IN THE AREA — 510

WHERE THE SAFEGUARD ACTION INCLUDES PROVIDING BY THE CONTROL SYSTEM SITUATIONAL INFORMATION TO THE OCCUPANT RELEVANT TO THE AREA, THE SITUATIONAL INFORMATION BEING DERIVED FROM THE SITUATIONAL DATA, AND BEING PROVIDED PRIOR TO THE OCCUPANT DEPARTING THE VEHICLE IN THE AREA — 515

FURTHER INCLUDING ASSOCIATING ONE OR MORE DEVICES WITH THE VEHICLE TO FACILITATE GENERATING THE SITUATIONAL DATA, THE CONTROL SYSTEM RECEIVING THE SITUATIONAL DATA FROM AT LEAST THE ONE OR MORE DEVICES — 520

WHERE THE SITUATIONAL DATA INCLUDES DATA SELECTED FROM THE GROUP CONSISTING OF VIDEO DATA, SENSOR-BASED DATA, GPS-BASED DATA, AND RADAR-BASED DATA — 525

WHERE THE AREA OUTSIDE THE VEHICLE IS ADJACENT TO THE VEHICLE AT A CURRENT LOCATION OF THE VEHICLE — 530

FIG. 5A

| | |
|---|---|
| WHERE THE CONTROL SYSTEM FURTHER RECEIVES A SPECIFIED DESTINATION FOR THE VEHICLE, AND THE AREA OUTSIDE THE VEHICLE INCLUDES A DESTINATION AREA OF THE VEHICLE BASED ON THE SPECIFIED DESTINATION | 535 |
| WHERE THE SITUATIONAL DATA INCLUDES SITUATIONAL INFORMATION ON THE DESTINATION AREA OF THE VEHICLE, THE SITUATIONAL DATA BEING DATA SELECTED FROM THE GROUP CONSISTING OF SOCIAL MEDIA DATA RELEVANT TO THE DESTINATION AREA, PUBLIC DOMAIN DATA RELEVANT TO THE DESTINATION AREA, AND SURVEILLANCE DATA FROM THE DESTINATION AREA | 540 |
| WHERE THE SAFEGUARD ACTION INCLUDES PROVIDING THE OCCUPANT WITH AN ALTERNATE DESTINATION TO DEPART THE VEHICLE BASED ON THE RISK LEVEL EXCEEDING A DEFINED THRESHOLD FOR THE OCCUPANT TO DEPART THE VEHICLE AT THE DESTINATION AREA | 545 |
| WHERE THE AREA OUTSIDE THE VEHICLE INCLUDES A FIRST AREA AND A SECOND AREA, THE FIRST AREA BEING AN AREA OUTSIDE THE VEHICLE AT A CURRENT LOCATION OF THE VEHICLE, AND THE SECOND AREA BEING THE DESTINATION AREA OF THE VEHICLE, THE SITUATIONAL DATA INCLUDING SITUATIONAL DATA FOR BOTH THE FIRST AND SECOND AREAS, AND THE SAFEGUARD ACTION INCLUDES NOTIFYING THE OCCUPANT OF A RISK LEVEL TO THE OCCUPANT IN DEPARTING THE VEHICLE IN THE FIRST AREA, AND A RISK LEVEL TO THE OCCUPANT IN DEPARTING THE VEHICLE IN THE SECOND AREA | 550 |
| WHERE THE VEHICLE INCLUDES MULTIPLE VEHICLE DOORS, AND THE SAFEGUARD ACTION INCLUDES PREVENTING BY THE CONTROL SYSTEM THE OCCUPANT FROM DEPARTING THE VEHICLE THROUGH AT LEAST ONE VEHICLE DOOR OF THE MULTIPLE VEHICLE DOORS BASED ON THE DETERMINED RISK LEVEL FOR THE OCCUPANT TO DEPART THE VEHICLE IN THE AREA, WHERE THE AREA IS ADJACENT TO AT LEAST ONE SIDE OF THE VEHICLE | 555 |
| WHERE THE CONTROL SYSTEM FURTHER RECEIVES OCCUPANT-RELATED DATA, AND THE DETERMINING THE RISK LEVEL IS BASED, IN PART, ON THE OCCUPANT-RELATED DATA | 560 |
| WHERE THE DETERMINING THE RISK LEVEL INCLUDES ASCERTAINING BY THE CONTROL SYSTEM A POSSIBLE THREAT WITHIN THE AREA BASED ON ANALYZING THE SITUATIONAL DATA | 565 |
| WHERE THE DETERMINING THE RISK LEVEL INCLUDES EVALUATING THE AREA BASED ON THE SITUATION DATA FOR ONE OR MORE OF AN ENVIRONMENTAL RISK OR A SAFETY RISK TO THE OCCUPANT IN DEPARTING THE VEHICLE IN THE AREA | 570 |
| WHERE BASED ON THE VEHICLE BEING IN AN ACCIDENT, THE CONTROL SYSTEM FURTHER RECEIVES ACCIDENT-RELATED DATA, AND THE DETERMINING THE RISK LEVEL IS ALSO BASED, IN PART, ON THE ACCIDENT-RELATED DATA | 575 |

VEHICLE-ASSOCIATED CONTROL SYSTEM TO SAFEGUARD AN OCCUPANT TO DEPART THE VEHICLE

BACKGROUND

Motor vehicles, electric vehicles, railed vehicles, etc. (generally referred to herein as vehicles), continue to evolve towards becoming semi-autonomous or autonomous vehicles. An autonomous vehicle, also known as a driverless vehicle or car, is a vehicle capable of sensing the environment and navigating without direct human input. Autonomous vehicles combine a variety of techniques to perceive their surroundings, including radar, laser light, GPS, odometry, and computer vision. Advanced control systems interpret sensory information to identify appropriate navigation paths, as well as vehicle obstacles and relevant signage. There are a number of benefits of autonomous vehicles, including reducing mobility and infrastructure costs, increasing safety, increasing mobility, increasing passenger satisfaction, and potentially significantly reducing traffic collisions.

SUMMARY

Certain shortcomings of the prior art are and additional advantages are provided herein through the provision of a method of safeguarding an occupant to depart from a vehicle. The method includes associating a control system with the vehicle. The control system receives situational data on an area outside the vehicle relevant to departure of the occupant from the vehicle, and determines a risk level for the occupant to depart the vehicle in the area. The determining of the risk level is based, at least in part, on the situational data. The control system further triggers a safeguard action based on the determined risk level for the occupant to depart the vehicle in that area.

In another aspect, a system for safeguarding an occupant to depart a vehicle is provided. The system includes a memory, and a processor communicatively coupled to the memory. The system performs a method, which includes receiving situational data on an area outside the vehicle relevant to departure of the occupant from the vehicle, and determining a risk level for the occupant to depart the vehicle in the area. The determining of the risk level is based, at least in part, on the situational data. The method further includes triggering a safeguard action based on the determined risk level for the occupant to depart the vehicle in the area.

In a further aspect, a computer program product for safeguarding an occupant to depart a vehicle is provided. The computer program product includes a computer readable storage medium having program instructions embodied therewith. The program instructions are executable by a processor to cause the processor to receive situational data on an area outside the vehicle relevant to departure of the occupant from the vehicle, and determine a risk level for the occupant to depart the vehicle in the area. Determining the risk level is based, at least in part, on the situational data. A safeguard action is triggered based on the determined risk level for the occupant to depart the vehicle in the area.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 4B is a table of one embodiment of types of situational information that can be represented by the situational data provided to the control system, in accordance with one or more aspects of the present invention;

FIGS. 5A & 5B depict further embodiments of details relating to one or more aspects of safeguarding an occupant to depart a vehicle, in accordance with one or more aspects of the present invention;

DETAILED DESCRIPTION

Figure 1:
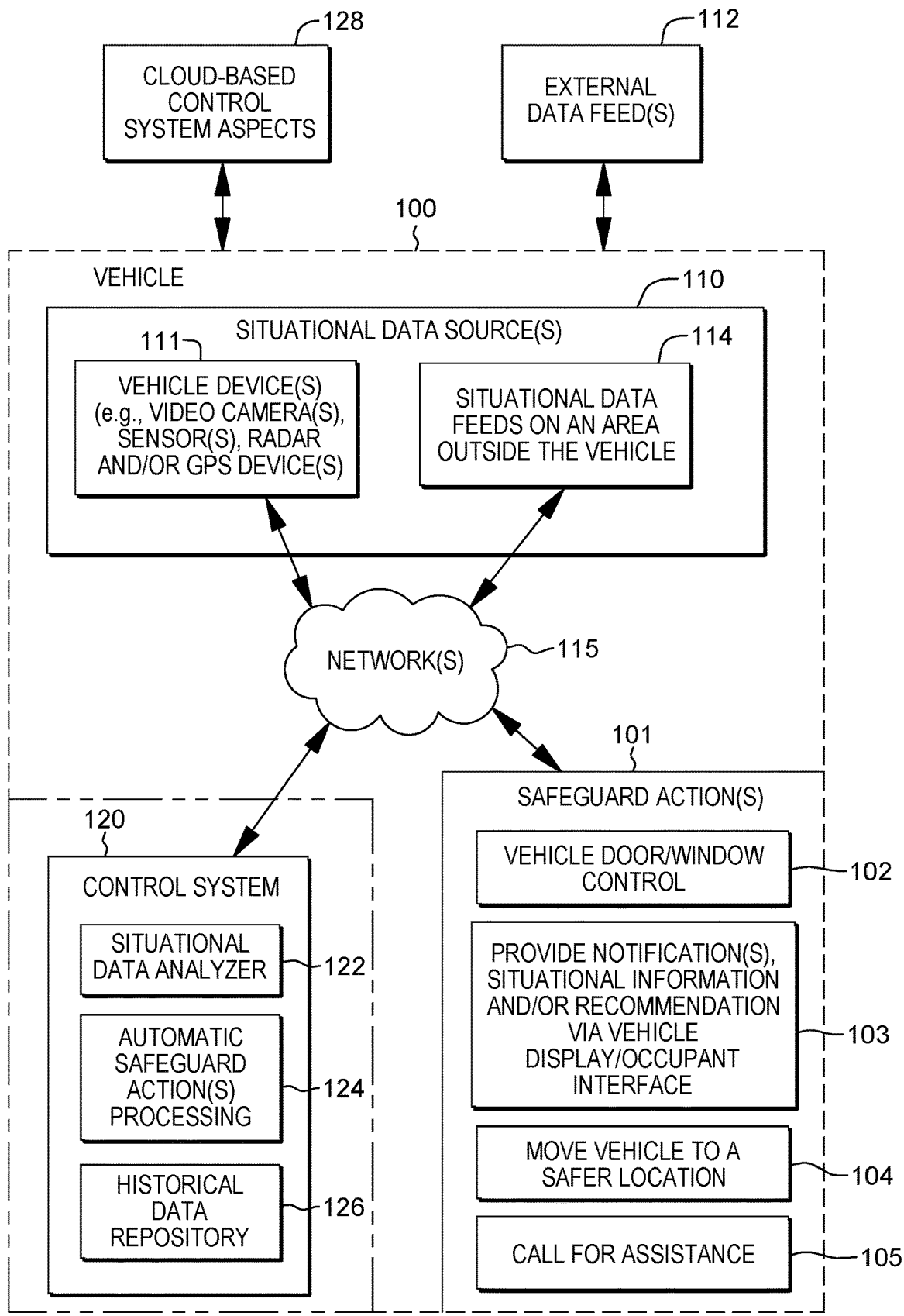
FIG. 1 depicts one embodiment of vehicle-associated system for safeguarding an occupant to depart a vehicle, in accordance with one or more aspects of the present invention.

Aspects of the present invention and certain features, advantages and details thereof, are explained more fully below with reference to the non-limiting example(s) illustrated in the accompanying drawings. Descriptions of well-known systems, devices, processing techniques, etc., are omitted so as to not unnecessarily obscure the invention in detail. It should be understood, however, that the detailed description in this specific example(s), while indicating aspects of the invention, is given by way of illustration only, and not by way of limitation. Various substitutions, modifications, additions, and/or other arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application of a method, system and/or computer program product for safeguarding an occupant to depart a vehicle.

The illustrative embodiments may be described below using specific code, designs, architectures, protocols, layouts, schematics, or tools only as examples, and are not limited to the illustrative embodiments. Furthermore, the illustrative embodiments may be described in certain instances using particular software, tools, and data processing environments only as example for clarity of description. The illustrative embodiments can be used in conjunction with other comparable or similarly purposed structures, systems, applications, or architectures. An illustrative embodiment can be implemented in hardware, software, or a combination thereof.

The examples in this disclosure are used only for clarity of description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed herein.

In accordance with one or more aspects, a vehicle-associated system is provided with situational data processing which includes, for instance, receiving situational data on an area outside the vehicle relevant to departure of an occupant from the vehicle. The system determines a risk level for the occupant to depart the vehicle in the area, based, at least in part, on the situational data. Based on the determined risk level for the passenger to depart the vehicle in that area, a safeguard action is triggered or performed by the system. In one or more aspects, the situational data is obtained from one or more vehicle-mounted devices including, for instance, one or more video cameras, sensors, radar devices, GPS devices, etc. For instance, in one or more aspects, the situational data can be, or can include, a video stream received from at least one video camera associated with the vehicle, with the video stream being analyzed by the system to determine a risk level for an occupant to depart the vehicle in a certain area, where the area can be an area adjacent to the vehicle's current location, or a destination area identified by the system from a specified destination for the vehicle. Once the risk level is determined, the system can trigger a safeguard action to help protect or assist the occupant to depart the vehicle.

As noted, the vehicle may be a motor vehicle or electric vehicle, such as a car, sport utility vehicle, truck, recreational vehicle, a railed vehicle, such as a train or tram, a watercraft, etc. In one or more embodiments, the vehicle can be an autonomous vehicle. Further, the one or more video cameras can be any imaging device associated with the vehicle for producing, for instance, a video transmission. The video stream or transmission can be streaming or not streaming (e.g., a series of discrete images), and can be digital or analog. By way of example, the video camera can be, in one or more aspects, a high-resolution video imaging camera, such as a 1080p HD camera, as well as others. In one or more aspects, the one or more video cameras can include at least one in-vehicle video camera imaging the interior of the vehicle when operational to image, for instance, the one or more occupants of the vehicle (such as a driver and/or one or more passengers) for use in safeguarding an occupant to depart the vehicle, as described herein. Further, in one or more aspects, the one or more video cameras can include one or more video cameras or other sensors monitoring, at least in part, an area outside of the vehicle to generate situational data on, for instance, another vehicle approaching the area, one or more people or animals in the area and/or approaching the area, an object in the area and/or approaching the area, the terrain in the area, etc.

By way of example, FIG. 1 depicts a schematic of one embodiment of a vehicle 100 with a system, including a control system 120, associated therewith, in accordance with one or more aspects disclosed herein. Note that the concepts disclosed herein apply to any type of vehicle from which an occupant is to depart.

In accordance with one or more aspects, the system receives situational data from one or more sources 110, which can include one or more vehicle-associated devices 111, such as one or more video cameras, sensors, radar devices, GPS devices, etc., mounted to or associated with the vehicle for generating situational data on an area outside the vehicle relevant to departure of an occupant from the vehicle. Note that, in one or more embodiments described herein, the area outside the vehicle is an area adjacent to a current location of the vehicle. In one or more other implementations, the area outside the vehicle can be, or can include, a destination area based on a specified destination for the vehicle to which the vehicle is yet to arrive.

Additionally, the system can receive situational data from one or more external data feeds 112. The vehicle devices 111 and/or external data feed(s) 112 thus provide situational data feeds on the area outside the vehicle 114, where the external data feed(s) 112 can be from, for instance, social media relevant to the destination area, public domain data relevant to the destination area, video feeds from one or more security cameras in the area, data feeds from one or more other vehicles in the area, etc. The situational data can be fed to control system 120 via a network 115.

As noted, in one or more embodiments, vehicle device(s) 111 can include one or more video cameras oriented to image outside of the vehicle to capture situational data relevant to an occupant departing the vehicle in a particular area. Further, in one or more embodiments, the vehicle device(s) 111 can include a video camera imaging the interior cabin of the vehicle to, for instance, capture video of the occupant to depart the vehicle for consideration in determining a risk level for that particular occupant to depart the vehicle in the area, as described herein. As illustrated, control system 120 can include, in one or more embodiments, a situational data analyzer 122, an automatic safeguard action-generating facility 124, and a historical data repository 126, to facilitate implementing one or more aspects of processing disclosed herein.

Note that one or more aspects of control system 120 can be implemented with, or resident within, vehicle 100 and/or may be remote from the vehicle, such as cloud-based aspects of the control system 128. Depending on the location, control system 120 can receive the video stream(s) and/or other situational data directly from vehicle devices 111, as well as situational data 114 from external data feeds 112 across network 115, and provide one or more control signals across the same network or a different network to implement one or more safeguard actions 101, which can include, in one or more embodiments, one or more door/window control actions 102, one or more vehicle display/occupant interface actions or recommendations 103, moving the vehicle to a safer location 104, calling for external assistance for the occupant 105, etc. By way of example, and depending on the location of control system 120, or cloud-based control system aspects 128, network 115 can be a telecommunications network, a local area network (LAN), a wide area network (WAN), such as the Internet, or a combination thereof, and include wired, wireless, fiber optic connections, etc. The network can include one or more wired and/or wireless networks that are capable of receiving and transmitting data, including image and/or video signals (i.e., a video stream).

Control system 120 can be, for instance, a computer system, and devices 111 and/or situational data feeds 114 can be integrated as part of the control system or separate. By way of example, the control system can include one or more processors, for instance, central processing units (CPU's). A processor can include functional components used in the execution of instructions such as functional components to fetch program instructions from locations such as cache or main memory, decode program instructions and execute program instructions, access memory for instruction execution, and write results of the executed instructions. A processor can also include a register(s) to be used by one or more of the functional components. The control system can include, for instance, memory, input/output (I/O), network interface and storage, which can include one or more data repositories 126. The components of the control system can be coupled to each other via one or more buses and/or other connections. Bus connections can represent one or more of any of several types of bus structures, including a memory bus or memory controller, a peripheral bus, an accelerated graphics port, and a processor or local bus using any variety of known bus architectures.

The control system memory can include main or system memory (e.g., random access memory) used in the execution of program instructions, storage device(s) such as hard drive(s), flash media or optical media as examples, and/or cache memory as examples. The memory can include, for instance, a cache, such as a shared cache, which may be coupled to a local cache (examples include L1 cache, L2 cache, etc.) of the processor within the control system. Additional memory may be or include at least one computer program product having a set (for instance, at least one) of program modules, instructions, coded alike that is/are configured to carry out functions and embodiments described herein when executed by one or more processors.

In one or more embodiments, the control system memory can store an operating system and other computer programs, such as one or more computer programs/applications that execute or perform aspects described herein. Specifically, program/applications can include computer readable program instructions that may be configured to carry out functions of embodiments of aspects described herein.

As noted, the control system can include a network interface which can be an example I/O interface that enables the control system to communicate with one or more networks. Further, the storage may be part of the control system or an external storage device. The storage may store one or more programs, one or more computer readable program instructions, and/or data, such as one or more data/video repositories, including in one or more implementations, one or more image databases. The control system may be operational with numerous other general purpose or special purpose computing system environments or configurations. The control system can take any of a variety of forms, such as those described herein. See also in this regard the discussion of FIGS. 6A-8 below.

Figure 2:
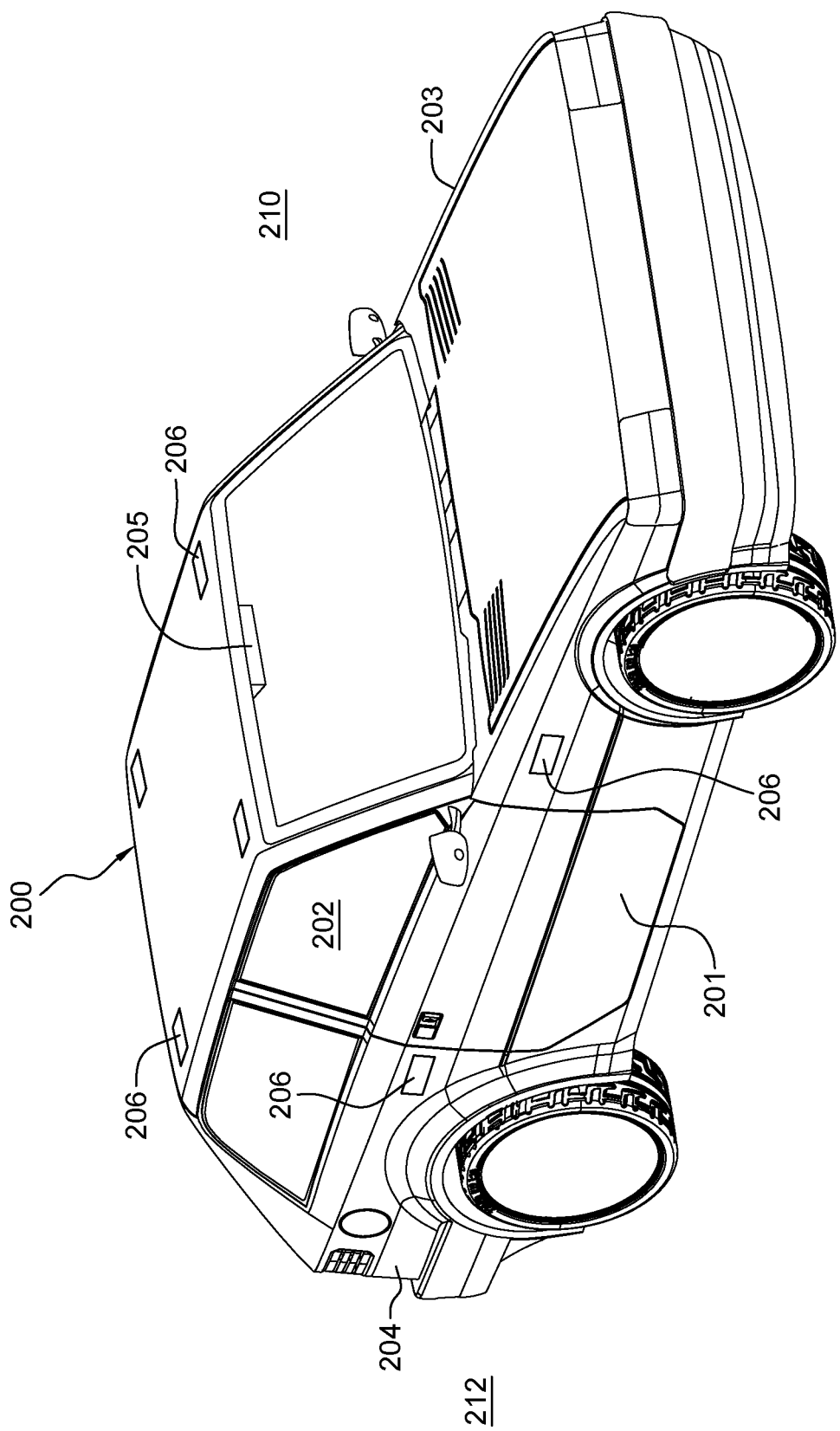
FIG. 2 depicts an example of a vehicle with an associated system to safeguard an occupant to depart the vehicle, in accordance with one or more aspects of the present invention.

FIG. 2 depicts an example of a vehicle 200, in this case a motor vehicle or electric vehicle, with a system 205 for safeguarding an occupant to depart the vehicle, in accordance with one or more aspects of the present invention. As illustrated, vehicle 200 can include one or more doors 201, and one or more windows 202 which can be controlled by system 205, as explained herein. Further, vehicle 200 can include one or more vehicle-associated devices, such as one or more sensors, video cameras, monitors, etc. 206 for generating situational data or situational data feeds to be received by the control system on an area outside the vehicle relevant to the departure of the occupant from the vehicle. For instance, opposite sides 203, 204 of vehicle 200 can include respective devices 206 to facilitate monitoring departure areas 210, 212, respectively, on opposite sides of vehicle 200. In this manner, system 205 can determine, for instance, whether it is safer for an occupant to depart the vehicle on one side of the vehicle or the other side of the vehicle in an area otherwise considered safe for the occupant to depart.

As noted, in one or more aspects, a system or control system is provided herein directed to identifying high risk situational information surrounding a vehicle, and triggering one or more safeguard actions to help protect an occupant to depart the vehicle. As an example, the safeguard actions can be, or can include, providing the occupant with situational information on the area prior to the occupant exiting the vehicle in the area.

Figure 3:
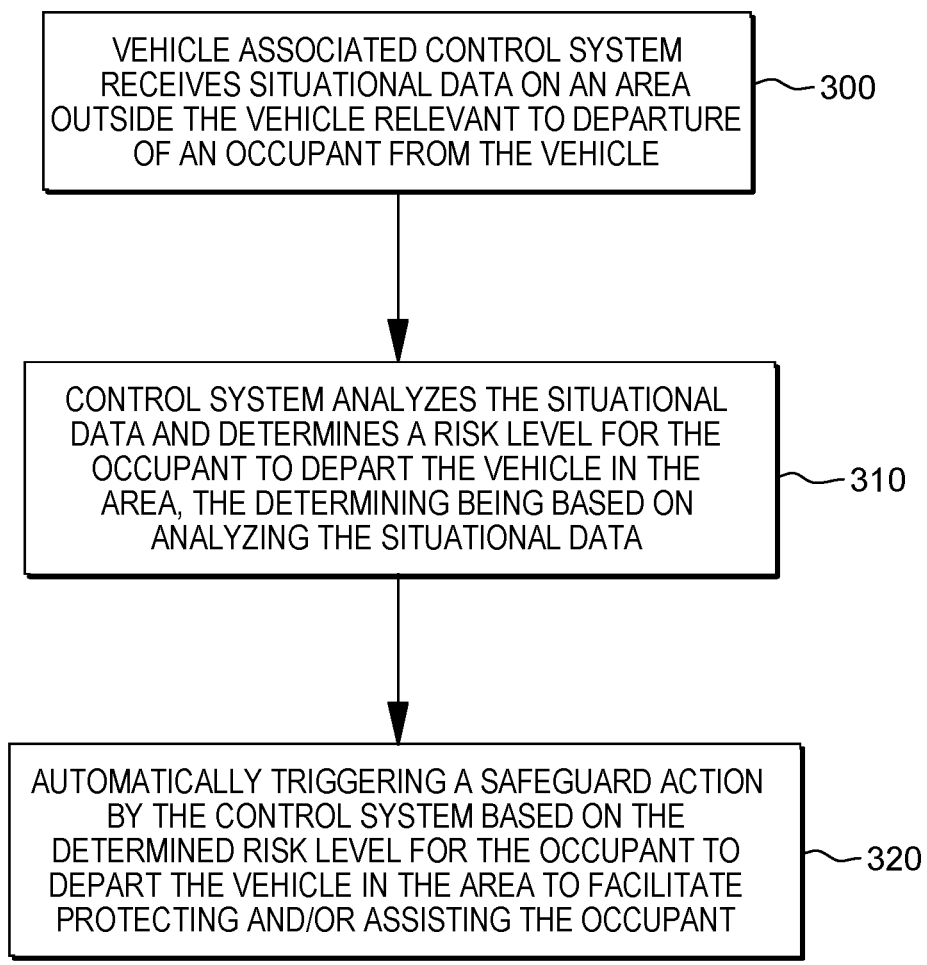
FIG. 3 depicts one embodiment of processing logic, in accordance with one or more aspects of the present invention.

By way of example, FIG. 3 depicts one embodiment of system processing, in accordance with one or more aspects of present invention.

Figure 4A:
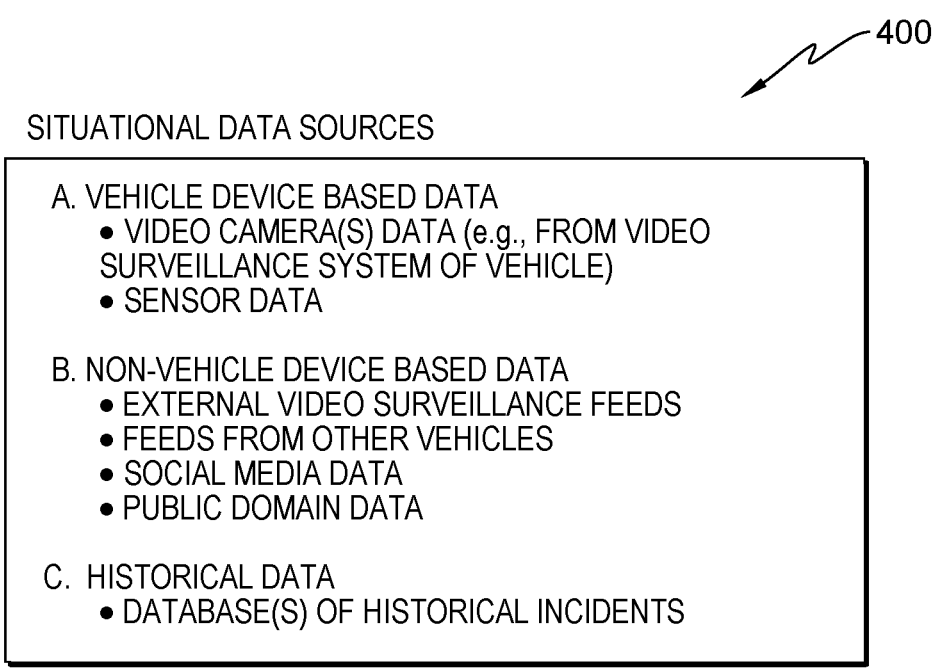
FIG. 4A is a table of one embodiment of situational data sources to provide situational data for control system processing, in accordance with one or more aspects of the present invention.

As illustrated, a vehicle-associated control system receives situational data on an area outside the vehicle relevant to departure of an occupant from the vehicle 300. The situational data can include situational data from a variety of situational data sources, such as data sources 400 listed in FIG. 4A. As shown in FIG. 4A, the situational data sources can be or can include vehicle device based data, such as video camera data (e.g. from a video surveillance system of an automated vehicle), and sensor data from vehicle-mounted devices. Further, the situational data sources can include non-vehicle device based data. For instance, external video surveillance feeds could be received by the control system, as well as feeds from other vehicles in the area, social media data and/or public domain data relevant to the area in which the occupant is to depart. Further, the situational data sources can include historical data saved, for instance, in a historical data repository associated with the control system, or a separate data repository of relevant information, such as a database of historical instances in a particular area.

As illustrated in FIG. 4B, the types of situational information 410 represented by the situational data received can vary as desired for a particular implementation. For instance, the types of situational information represented in the data could include environmental information, safety/security information, physical location-related information, accident-related information, etc. In one or more implementations, the environmental information could relate to, for instance, air quality, such as determined by sampling, for instance, of poisonous or toxic fumes, particulate count, etc. Further, the environmental information could relate to determining whether an earthquake is occurring, or could be weather-related information such as the existence of a hurricane, tornado, thunder/lightning, etc., in the area or approaching the area. The safety/security information could include, for instance, traffic information for the location, such as other vehicles or bikes approaching the area in which the occupant is to depart, one or more threatening animals, objects, etc., within the area. For instance, the situation data could include situational information which shows that a response team is entering a building in the area, or that there is a particularly dangerous type of animal, such as a wolf, bear, poisonous snake, poisonous insect, and/or an insect known to carry a disease in a particular area, etc. The physical location-related information could include, for instance, terrain-related information, such as there is a cliff or ravine at one side of the vehicle, or that there is flooding adjacent to the vehicle, or a potentially harmful obstruction. Note that the physical location-related information could be evaluated by the control system in combination with occupant dependent information, such as the control system determining that the occupant is young or elderly, handicapped, etc. Further, where the vehicle has been involved in an accident, or there is an accident in the area, accident-related information could be included in the situational information represented by the situational data. For instance, the situational information could indicate whether an occupant is injured, whether there is damage to a vehicle, and can be used by the control system to predict intent of people outside the vehicle, for instance, that the people are identified as rescuers attempting to assist the occupant within the vehicle.

Continuing with the processing of FIG. 3, the control system analyzes the situational data and determines therefrom, in one or more embodiments, a risk level for the occupant to depart the vehicle in the area 310. In one or more embodiments, a situational risk score or level can be derived from a plurality of factors, including: 1) occupant data (e.g., is the occupant disabled); 2) time of day; 3) location parameters (isolated or busy street; 4) local assemblages (e.g., density and demographic of local population); 5) event awareness (e.g., soccer game or protest occurring); 6) law enforcement or other official situation (e.g., a police activity or military parade), etc. Scores for each parameter, in at least one embodiment, can be ordinally scaled risk numbers proportional to the current situation. Ordinally scaled risk numbers, in at least one embodiment, can be derived from a knowledge database wherein relative risk conditions are normalized to the extremes, and risk numbers derived. For example, ordinal risks for time of day might be "1" for any time between 9:00 AM and 3:00 PM, "5" for any time between 4:00 PM and 9:00 PM, "7" for any time between 10:00 PM and 12:00 AM, and "10" for any time between 1:00 AM and 6:00 PM. Since the extremes are "1" for nominal business hours and "10" for early morning hours, all other times, other conditions being equal, can be interpolated between these two extremes, based on expert assessment. Note also that determining a risk level can be to a variety of gradients, as may be desired for a particular implementation. For instance, the risk scale could be a no risk or risk scale, a low, moderate or high risk scale, a number-based scale, such as a scale of 1 to 10, etc.

Figure 4C:
FIG. 4C is a table of one embodiment of safeguard actions that can be automatically performed by the control system, in accordance with one or more aspects of the present invention.

The control system automatically triggers, or performs, a safeguard action based on the determined risk level for the occupant to depart the vehicle in the area to facilitate protecting or assisting the occupant 320. FIG. 4C depicts exemplary safeguard actions 420 that can be automatically triggered or performed by the control system. For instance, the control system could be configured to control opening and/closing of one or more vehicle doors or windows based on the determined risk level, provide notification(s) and/or alerts to the departing occupant of the situational information and/or the risk level, provide a recommendation to the departing occupant with respect to the situational information and the area to which the occupant is to depart the vehicle, automatically move the vehicle to a nearby safer location for the occupant to depart, call for external assistance for the occupant, such as for external assistance for a handicapped occupant to assist the occupant in departing the vehicle in the area, etc.

Note that in one or more further aspects, the control system can receive a specified destination for the vehicle, and the area outside the vehicle being evaluated can include a destination area of the vehicle based on the specified destination. For instance, the situational data can include situational information on the destination area of the vehicle, such as social media data relevant to the destination area, public domain data relevant to the destination area, surveillance data from the destination area, etc. In one or more embodiments, the safeguard action could include providing the occupant with an alternative destination area to depart the vehicle, for instance, based on the risk level exceeding a defined threshold for the occupant to depart the vehicle at the destination area.

In one or more implementations, the control system receives sensor data, radar data and/or video data from vehicle-associated devices, where the data is situational data associated with an area surrounding the vehicle. Based on determining that the vehicle is navigating to a particular location, the control system can also receive social media data, and other public domain data relevant to the destination area with current news or other events occurring at that location. Based on determining that the vehicle has arrived at the destination, the control system can analyze the sensor data, radar data, video data, etc. provided by the vehicle-associated devices, and based on the analyzing, determine a risk level for the area outside the vehicle in which the occupant is to depart. For instance, the control system can determine whether an animal is hiding in the shadows in the area and provide an appropriate risk level based therein. Further, the risk level can be based on analyzing the social media data and/or public domain data with news for the area. For instance, if a response team is detected in the vicinity of the destination area, the risk level can be raised for the particular location, and provided to the occupant prior to departure with, for instance, a safety recommendation.

As will be understood based on this disclosure, a variety of novel aspects can be implemented by a control system such as described herein. For instance, the control system can determine if the area outside the vehicle relevant to departure of the occupant from the vehicle is safe for the occupant to depart, or whether the occupant should remain within the vehicle. The control system could be part of an autonomous vehicle that can evaluate people or animals surrounding the vehicle, or at the area outside the vehicle relevant to departure of the occupant from the vehicle, and decide whether the occupant can safely depart the vehicle. In one or more implementations, the control system can identify a level of pollution or other threat to the occupant in departing the vehicle at a particular location or that might create a problem to the occupant if the vehicle door and/or window were opened. Further, in one or more aspects, the control system can take action subsequent to an accident to assist an occupant of the vehicle. For instance, the control system can determine whether a door or window should immediately be opened to facilitate rescue or facilitate departure of the occupant from the vehicle, or whether the external surroundings of the vehicle create a further, higher risk to the occupant in departing the vehicle at that location. In this aspect, the control system can perform comparative priority analysis, that is, whether it is less risky for the individual to depart the vehicle or to stay in the vehicle. In at least one embodiment, the control system can be associated with an autonomous vehicle, and can automatically open one or more doors and/or windows to aid in occupant rescue upon an accident (once the vehicle is no longer moving). In another embodiment, the system can assess a post-accident situation for suitability to allow the occupant to exit (e.g., is the terminal position of the vehicle in the middle of a high-speed highway). In another embodiment, the system can assess the occupant's medical condition (could be by solicitation-response or analysis of video, etc.), and based on the occupant's condition, and the situational condition, one or more doors or windows could be opened to assist in rescue. In one or more embodiments, these system assessments and responses can be performed or operated via artificial intelligence and/or cognitive learning aspects of the control system.

As further examples, a control system such as disclosed herein can analyze the situational data to determine whether the area outside the vehicle relevant to departure of the occupant from the vehicle is safe so that a door or window of the vehicle can be opened. The control system can take one or more safeguard actions to ensure that the passenger will not be in trouble after departing the vehicle or opening the window. For instance, an autonomous vehicle can reach a specified destination, and in doing so, the control system can evaluate the situational data and identify that the particular location is not safe for the occupant to depart, since doing so might create a problem for the occupant. The control system could send a recommendation to the occupant, for instance, via a vehicle mounted display, informing the occupant of the situational information and risk level in departing the vehicle at that time, and could recommend that the occupant wait a period of time for the risk to depart or dissipate, or could recommend that the vehicle move to a nearby safer location for the occupant to depart. The occupant might want to still get out notwithstanding the higher risk, and the occupant can signal the control system to open the door notwithstanding the higher risk, as desired.

As another example, machine learning techniques could be employed by the control system to evaluate intent of, for instance, one or more people in an area outside the vehicle before opening the door of the vehicle, or before opening a window of the vehicle. For instance, should a high risk be detected, then the control system can take the safeguard action of preventing a door or window from opening, and/or move the vehicle to a nearby safer location for the protection of the occupant. In one or more embodiments, the control system could be associated with an autonomous vehicle, and based on video data analysis could identify that threatening animals are in a surrounding area, and the safeguard action could be to prevent the opening of a vehicle door or could be to notify or alert an occupant of the situational information and/or risk, and provide one or more recommendations to the occupant.

In one or more further implementations, prior to opening a door or window of the vehicle, the control system could analyze the situational data and determine from, for instance, environmental data whether there is a high risk of harm to the occupant due to pollution, or any other factor from the external surrounding that is not otherwise impacting the occupant traveling within the vehicle until departure. For instance, the control system could identify that the area outside the vehicle, whether at the current location of the vehicle, or the destination area associated with a specified destination for the vehicle, has a significant level of insects (such as mosquitoes), or has noxious fumes, etc., and the control system can trigger or perform a safeguard action to prevent the vehicle door from opening at that location, or to prevent the occupant from opening a window at that area, and/or to maintain speed of the vehicle to ensure that potentially dangerous insects or fumes, etc., do not enter the vehicle.

As noted, in one or more other embodiments, the control system could facilitate safeguarding an occupant after an accident has occurred involving the vehicle. For instance, after an accident, help from surrounding people at the accident location may be required to rescue the occupant. In such a case, the control system can perform comparative priority evaluation between, for instance, the need of occupant rescue, verses any threatening animals about the vehicle. Based on this comparative priority analysis, the control system can make a decision whether to open, for instance, a vehicle door or window. For instance, should an autonomous vehicle be involved in an accident, support from surrounding people may be required to save an occupant's life, in which case, the action could be to open one or more vehicle doors automatically. If the occupant has only a minor injury, and the external area is not appropriate for the occupant to depart, then the safeguard action could be to inhibit or prevent the occupant from departing the vehicle at that location. In the case where a lifesaving event is needed, then the vehicle door can be automatically opened by the control system, but for minor occupant injuries, the control system may not automatically open the door, but wait to drive the vehicle to another, safer location for the occupant to depart the vehicle depending on the analyzed situational data. Alternatively, the control system can simply wait for the area outside the vehicle to become safer before opening a door or window for an occupant.

In one or more specific embodiments, a control system such as described herein can be implemented in association with a vehicle such as an autonomous vehicle and reuse the intelligent video surveillance system, and associated knowledge database, of today's autonomous vehicles. The camera and sensor feeds can be analyzed by the control system to identify any possible risk in the surrounding area should the occupant depart from the vehicle in that area, which as noted could be an area outside the vehicle at a current location of the vehicle, or a destination area associated with a specified destination for the vehicle to which the vehicle has yet to arrive. In the case of an autonomous vehicle, the security system of the vehicle could be reused by the control system disclosed herein to facilitate anticipating an incident that could occur in the destination area based, for instance, on social media data, public domain data, and/or external video surveillance system.

In the case of an autonomous vehicle implementation, the autonomous vehicle system knows the destination, and time to reach the destination, etc. Accordingly a control system such as described herein associated with the autonomous vehicle can gather information from the destination area to find, for instance, a current status of the area at the vehicle's destination. Depending on the current status, a safeguard action could then be triggered by the control system before the vehicle even reaches the destination to allow, for instance, the occupant to reroute the vehicle to a different destination.

In one or more embodiments where the control system is associated with an autonomous vehicle, once the vehicle has reached a specified destination, the various vehicle mounted cameras and sensors can be gathering situational data, that is, real time surrounding data at that location, and can also be connecting to nearby video surveillance systems to analyze the current situation in the surrounding area, that is, the destination area in this example.

As noted, in one or more embodiments, the control system can also analyze occupant-related data to determine whether the risk level is higher for the particular occupant in the vehicle for the analyzed situational information.

In one or more additional embodiments, historical incident analysis can be performed by the control system to identify various risk factors with different types of passengers, and determine whether the current surrounding area is appropriate for the occupant to depart the vehicle. For instance, the control system can be associated with an autonomous vehicle and contain a historical incident database, such as in different surrounding contexts what incidents happened, and who was impacted, how much the occupant was impacted, etc. The database can be created by analyzing historical data or by, for instance, manually imputing or configuring information into the control system, such as into the control system's historical data repository.

In one or more embodiments, during an accident, one or more cameras and or sensors installed inside the vehicle can analyze the severity of the accident to one or more occupants, and the type of injury to the occupant, as well as damage to the vehicle itself. Based on detecting the accident, the control system could trigger a safeguard action of opening a vehicle door or window, for example, after comparing any external issues with the benefit of rescue for the occupant. For instance, if the control system determines that the situational data presents a high risk level to the occupant, which would create a further problem to the occupant, then the autonomous vehicle could, take the action of preventing opening of the door, and initiate an alternate method of assisting the occupant, such as calling for rescue people, and/or moving the vehicle to a different area to facilitate the occupant's safe departure.

As noted, in one or more embodiments, prior to opening a door or window of a vehicle, the control system could also analyze a level of pollution in the area outside the vehicle, which could create a health risk to the occupant departing the vehicle. Based on the environmental data, the control system could determine a risk factor to the occupant, and trigger a safeguard action to help the occupant.

FIGS. 5A & 5B depict one embodiment of an overview of various processes of safeguarding an occupant to depart a vehicle, in accordance with one or more aspects of the present invention. As depicted in FIG. 5A, a method of safeguarding an occupant to depart a vehicle is provided 500. The safeguarding method includes associating a control system with a vehicle, where the control system receives situational data on an area outside the vehicle relevant to departure of the occupant from the vehicle, and determines a risk level for the occupant to depart the vehicle in the area. The determining of the risk level is based, at least in part, on the situational data, and the method includes triggering a safeguard action by the control system based on the determined risk level for the occupant to depart the vehicle in that area.

In one or more implementations, the safeguard action includes inhibiting by the control system opening of a vehicle door based on the risk level exceeding a defined threshold 505. In one or more other embodiments, the safeguard action includes notifying by the control system the occupant of the risk level to the occupant in departing the vehicle in the area 510. In one or more further embodiments, the safeguard action includes providing by the control system situational information to the occupant relevant to the area 515. The situational information is derived from the situational data, and can be provided by the control system to the occupant prior to the occupant departing the vehicle in the area.

In one or more implementations, the method further includes associating one or more devices with the vehicle to facilitate generating the situational data, where the control system receives the situational data from at least the one or more devices 520. For instance, the situational data can include video data, sensor based data, GPS based data, radar based data, etc. 525. Further, in one or more embodiments, the area outside the vehicle can be adjacent to the vehicle at a current location of the vehicle 530.

As shown in FIG. 5B, in one or more embodiments, the control system further receives a specified destination for the vehicle, and the area outside the vehicle includes a destination area of the vehicle based on the specified destination 535. In one or more embodiments, the situational data includes situational information on the destination area of the vehicle, with the situational data being social media data relevant to the destination area, public domain data relevant to the destination area, and/or surveillance data from the destination area 540. In one or more implementations, the safeguard action includes providing the occupant with an alternate destination to depart the vehicle based on the risk level exceeding a defined threshold for the occupant to depart the vehicle at the destination area 545. In one or more implementations, the area outside the vehicle includes a first area and a second area, where the first area is an area outside the vehicle at a current location of the vehicle and the second area is the destination area of the vehicle 550. The situational data can include situational data for both the first and second areas, and the safeguard action can include notifying the occupant of a risk level to the occupant in departing the vehicle in the first area, and a risk level to the occupant in departing the vehicle in the second area.

In one or more embodiments, the vehicle includes multiple vehicle doors, and the safeguard action includes preventing by the control system the occupant from departing the vehicle through at least one vehicle door of the multiple vehicle doors based on the determined risk level for the occupant to depart the vehicle in that area, where the area is adjacent to at least one side of the vehicle 555.

In one or more embodiments, the control system further receives occupant-related data, and the determining the risk level is based, at least in part, on the occupant-related data 560. In one or more embodiments, the determining the risk level includes ascertaining by the control system a possible threat within the area based on analyzing the situational data 565. In one or more embodiments, determining the risk level includes evaluating the area based on the situational data for one or more of an environmental risk or a safety risk to the occupant in departing the vehicle in the area 570. In one or more implementations, based on the vehicle being in an accident, the control system further receives accident-related data, and determining the risk level is also based, in part, on the accident-related data 575.

One example of a computer system that includes processors that may be used by one or more aspects of the present invention is described with reference to FIG. 6A. In this example, the computer system is part of a computing environment including additional components that may or may not be used by aspects of the present invention.

Figure 6A:
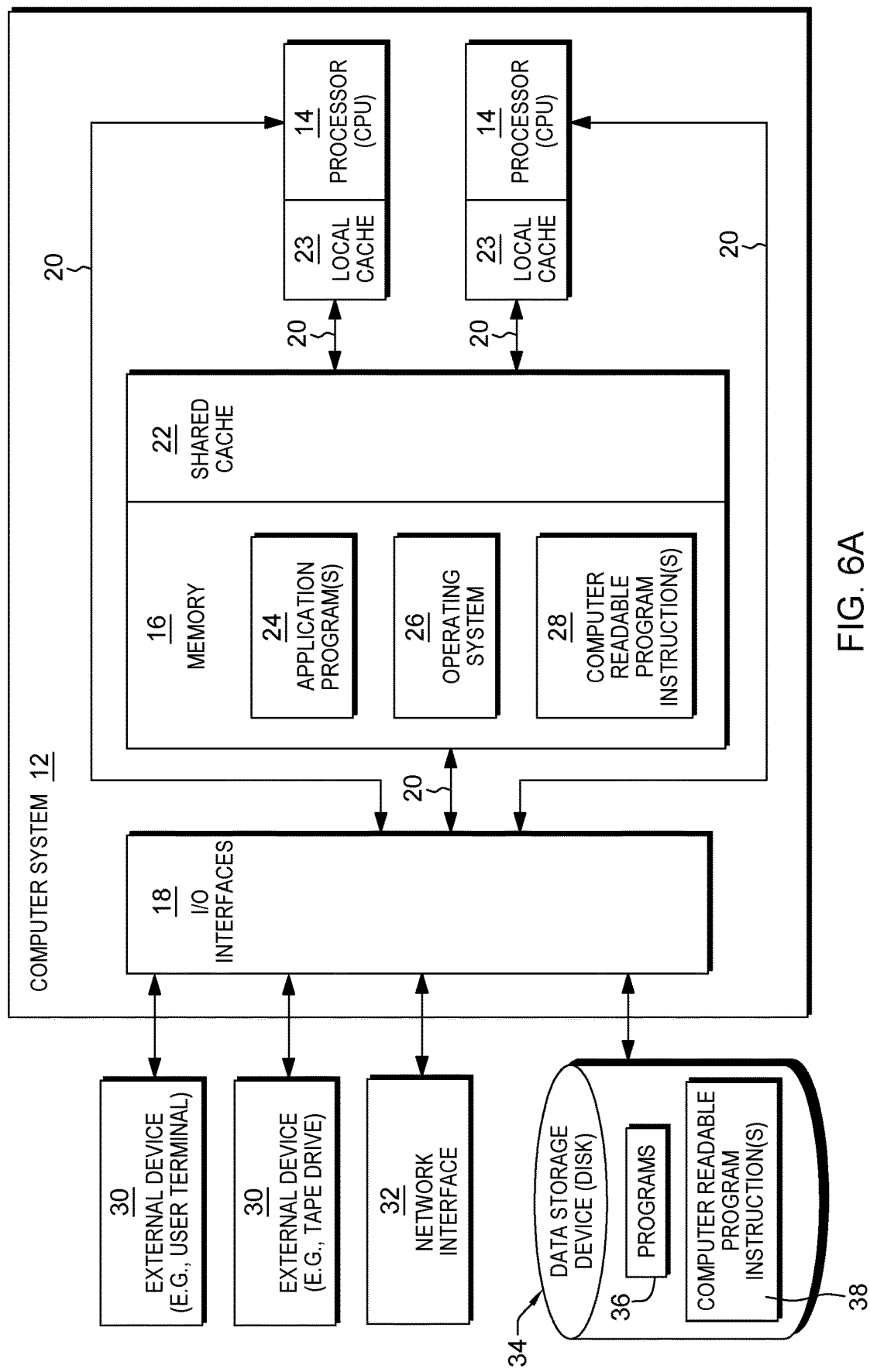
FIG. 6A depicts one example of a computing environment to incorporate and use one or more aspects of the present invention.

As shown in FIG. 6A, a computing environment 10 includes, for instance, a computer system 12 shown, e.g., in the form of a general-purpose computing device. Computer system 12 may include, but is not limited to, one or more processors or processing units 14 (e.g., central processing units (CPUs)), a memory 16 (a.k.a., system memory, main memory, main storage, central storage or storage, as examples), and one or more input/output (I/O) interfaces 18, coupled to one another via one or more buses and/or other connections 20.

Bus 20 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 16 may include, for instance, a cache 22, such as a shared cache, which may be coupled to local caches 23 of processors 14. Further, memory 16 may include one or more programs or applications 24, an operating system 26, and one or more computer readable program instructions 28. Computer readable program instructions 28 may be configured to carry out functions of embodiments of aspects of the invention.

Computer system 12 may also communicate via, e.g., I/O interfaces 18 with one or more external devices 30, one or more network interfaces 32, and/or one or more data storage devices 34. Example external devices include a user terminal, a tape drive, a pointing device, a display, etc. Network interface 32 enables computer system 12 to communicate with one or more networks, such as a local area network (LAN), a general wide area network (WAN), and/or a public network (e.g., the Internet), providing communication with other computing devices or systems.

Data storage device 34 may store one or more programs 36, one or more computer readable program instructions 38, and/or data, etc. The computer readable program instructions may be configured to carry out functions of embodiments of aspects of the invention.

Computer system 12 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 12. Examples, include, but are not limited to: microcode, device drivers, redundant processing units, external disk drive arrays, RAID systems, tape drives, and data archival storage systems, etc.

Computer system 12 may be operational with numerous other general purpose or special purpose computing system environments or configurations. Examples of well-known computing systems, environments, and/or configurations that may be suitable for use with computer system 12 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In one example, a processor, such as processor 14, may execute one or more components to perform one or more aspects of the present invention. These components may be stored in memory, including main memory (e.g., memory 16) and/or one or more caches (e.g., shared cache 22, local cache 23) and/or external storage (e.g., device 34), and may be executed by one or more processors (e.g., processor 14).

Figure 6B:
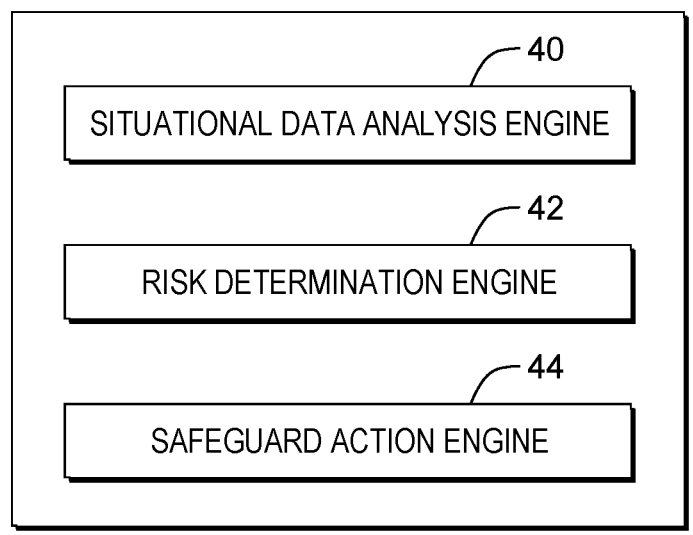
FIG. 6B depicts further details of a processor of FIG. 6A, in accordance with one or more aspects of the present invention.

In one example, referring to FIG. 6B, the components may include a monitoring engine 40 used in monitoring for events; a detection engine 42 used in detecting a particular type of event; and an adjustment engine to initiate an action to automatically adjust visual light transmission through one or more smart glass windows of the vehicle. The components executed by a processor may be individual components or combined in one component. Further, other components may be included to perform one or more other tasks. Many variations are possible.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
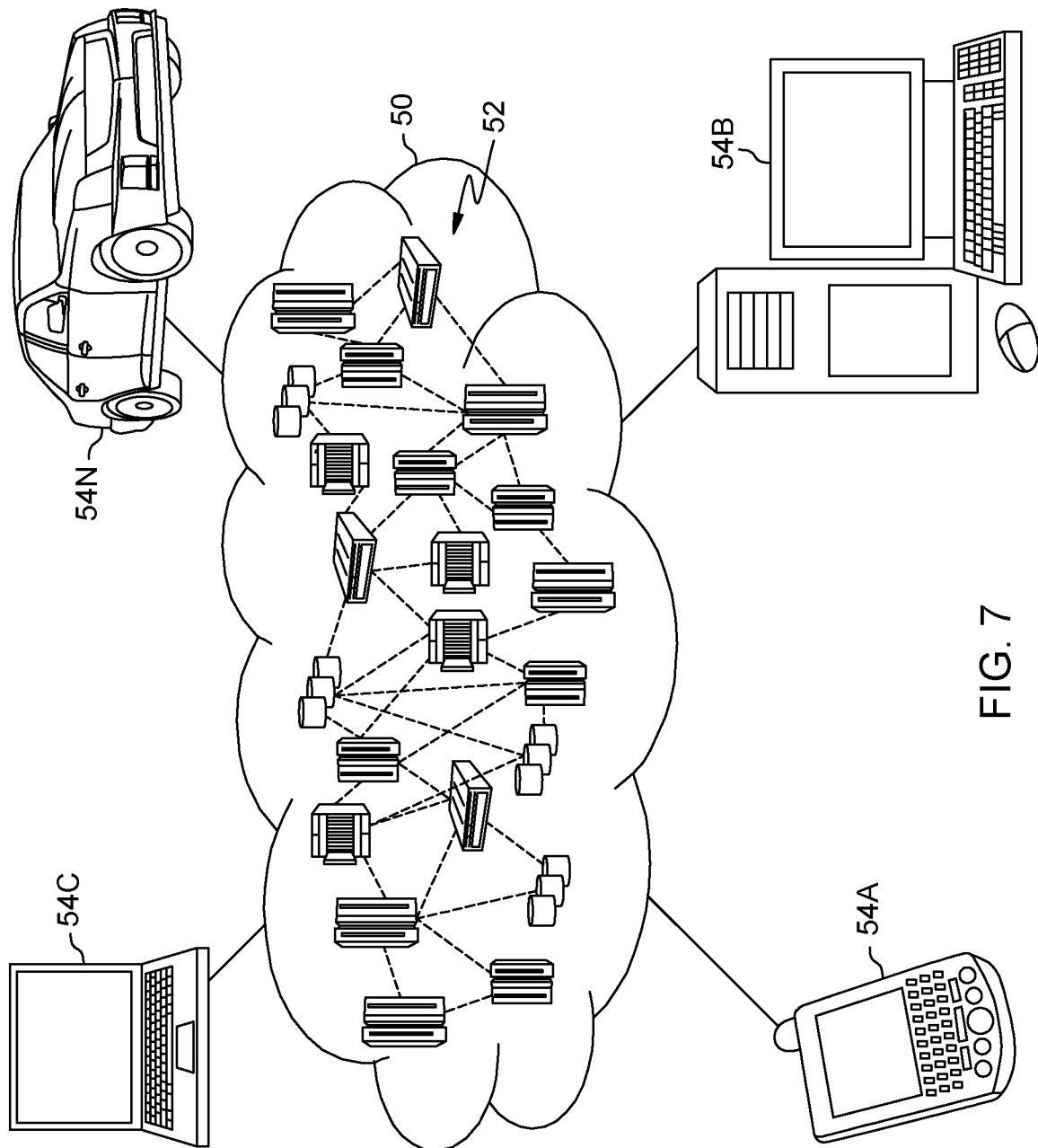
FIG. 7 depicts one embodiment of a cloud computing environment, which may implement, or be used in association with, one or more aspects of the present invention.

Referring now to FIG. 7, illustrative cloud computing environment 50 is depicted. As shown, cloud computing environment 50 comprises one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 52 and cloud computing environment 50 can communicate with any type of computerized device over any type of network and/or network addressable connection (e.g., using a web browser).

Figure 8:
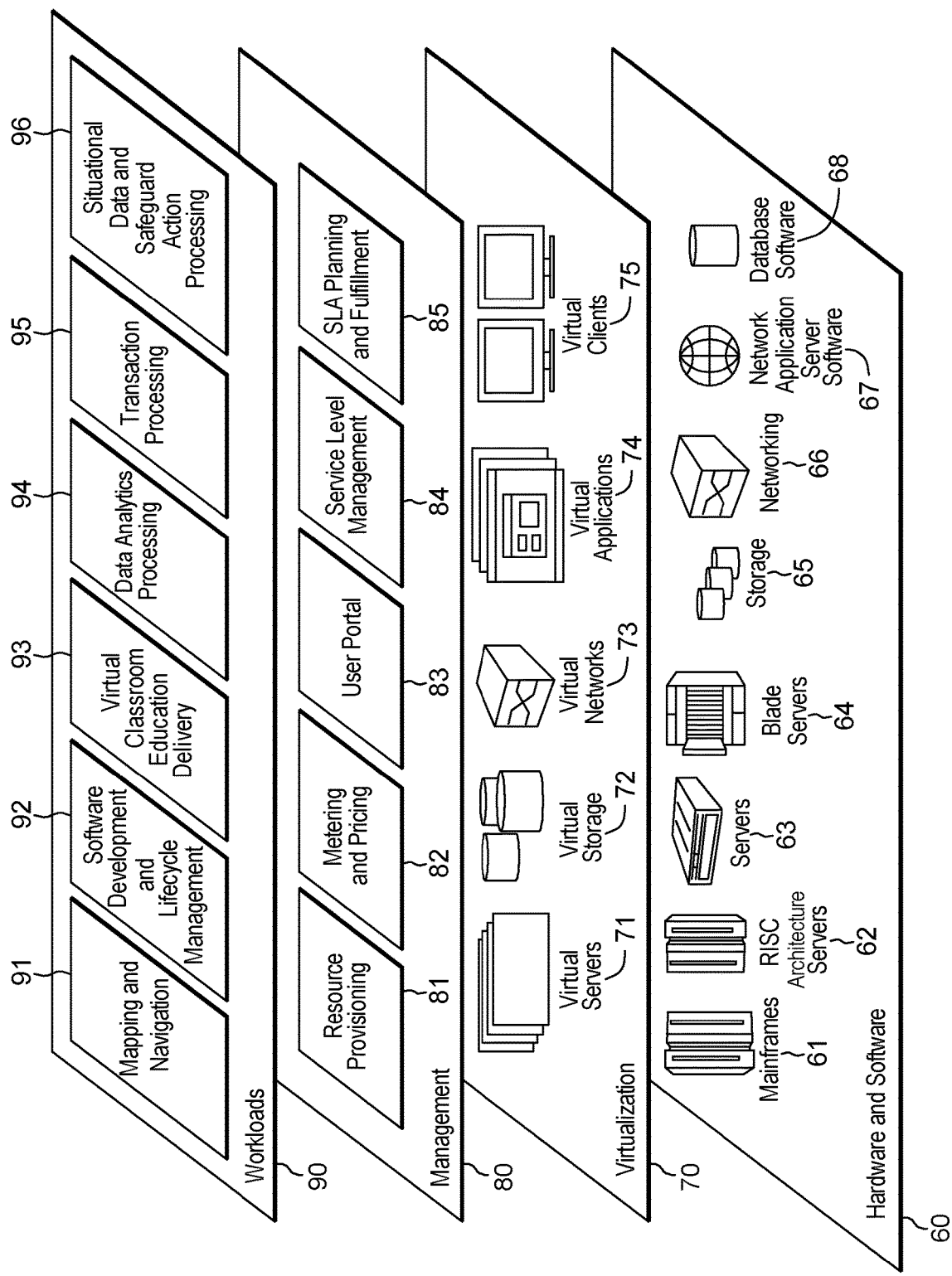
FIG. 8 depicts one example of abstraction model layers, which may facilitate or implement protecting an occupant to depart from a vehicle, in accordance with one or more aspects of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided.

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and one or more aspects of situational data and safeguard action processing 96, in accordance with the present invention.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, other types of devices and/or tracking components may be used in one or more embodiments. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A method of safeguarding an occupant to depart a vehicle, the method comprising:
    associating a control system with the vehicle, the control system:
        receiving an occupant-specified destination for the vehicle;
        receiving situational data on an area outside the vehicle relevant to departure of the occupant from the vehicle, the area outside the vehicle comprising a destination area of the vehicle based on the occupant-specified destination, the situational data comprising situational information on the destination area of the vehicle, the situational data being data obtained by the control system prior to the vehicle reaching the specified destination, and the situational data including a plurality of data, the plurality of data including occupant-related data, time of day data, destination-location parameter data, instant social media data related to the destination area, and instant public domain data on the destination area, including any local assemblage data and official situation data on the occupant-specified destination;
        determining a risk level for the occupant to depart the vehicle in the area, the determining being based on the situational data and being representative of a risk to the occupant in departing the vehicle in the area; and
        triggering a safeguard action by the control system based on the determined risk level for the occupant to depart the vehicle in that area, the safeguard action comprising inhibiting by the control system opening of a vehicle door based on the risk level exceeding a defined threshold, and the safeguard action comprising providing, by the control system, the occupant with an alternate destination area to depart the vehicle based on the risk level exceeding the defined threshold for the occupant to depart the vehicle at the destination area, the providing occurring prior to the vehicle reaching the specified destination.

2. The method of claim 1, wherein the safeguard action comprises notifying by the control system the occupant of the risk level to the occupant in departing the vehicle in the area.

3. The method of claim 1, wherein the safeguard action comprises providing by the control system situational information to the occupant relevant to the area, the situational information being derived from the situational data, and being provided prior to the occupant departing the vehicle in the area.

4. The method of claim 1, further comprising associating one or more devices with the vehicle to facilitate generating the situational data, the control system receiving the situational data from at least the one or more devices.

5. The method of claim 4, wherein the situational data comprises data selected from the group consisting of video data, sensor-based data, GPS-based data, and radar-based data.

6. The method of claim 5, wherein the area outside the vehicle is adjacent to the vehicle at a current location of the vehicle.

7. The method of claim 1, wherein the area outside the vehicle comprises a first area, the first area being an area outside the vehicle at a current location of the vehicle, and a second area being the destination area of the vehicle, the situational data comprising situational data for both the first and second areas, and the safeguard action comprises notifying the occupant of a risk level to the occupant in departing the vehicle in the first area, and a risk level to the occupant in departing the vehicle in the second area.

8. The method of claim 1, wherein the vehicle comprises multiple vehicle doors, and the safeguard action comprises preventing by the control system the occupant from departing the vehicle through at least one vehicle door of the multiple vehicle doors based on the determined risk level for the occupant to depart the vehicle in the area, where the area is adjacent to at least one side of the vehicle.

9. The method of claim 1, wherein the determining the risk level comprises ascertaining by the control system a possible threat within the area based on analyzing the situational data.

10. The method of claim 1, wherein the determining the risk level comprises evaluating the area based on the situational data for one or more of an air-borne risk to the occupant in departing the vehicle in the area.

11. The method of claim 1, wherein based on the vehicle being in an accident, the control system further receives accident-related data, and the determining the risk level is also based, in part, on the accident-related data.

12. A system for safeguarding an occupant to depart a vehicle, the system comprising:
   a memory; and
   a processor communicatively coupled to the memory, wherein the system is configured to:
      receive an occupant-specified destination for the vehicle;
      receive situational data on an area outside the vehicle relevant to departure of the occupant from the vehicle, the area outside the vehicle comprising a destination area of the vehicle based on the occupant-specified destination, the situational data comprising situational information on the destination area of the vehicle, the situational data being data obtained by the control system prior to the vehicle reaching the specified destination, and the situational data including a plurality of data, the plurality of data including occupant-related data, time of day data, destination-location parameter data, instant social media data related to the destination area, and instant public domain data on the destination area, including any local assemblage data and official situation data on the occupant-specified destination;
      determine a risk level for the occupant to depart the vehicle in the area, the determining being based on the situational data and being representative of a risk to the occupant in departing the vehicle in the area; and
      triggering a safeguard action by the control system based on the determined risk level for the occupant to depart the vehicle in that area, the safeguard action comprising inhibiting by the control system opening of a vehicle door based on the risk level exceeding a defined threshold, and the safeguard action comprising providing, by the control system, the occupant with an alternate destination area to depart the vehicle based on the risk level exceeding the defined threshold for the occupant to depart the vehicle at the destination area, the providing occurring prior to the vehicle reaching the specified destination.

13. The system of claim 12, wherein the triggered safeguard action comprises notifying the occupant of the risk level to the occupant in departing the vehicle in the area.

14. A computer program product for safeguarding an occupant to depart a vehicle, the computer program product comprising:
   a computer-readable storage medium having program instructions embodied therewith, the program instructions being executable by a processor to cause the processor to:
      receive an occupant-specified destination for the vehicle;
      receive situational data on an area outside the vehicle relevant to departure of the occupant from the vehicle, the area outside the vehicle comprising a destination area of the vehicle based on the occupant-specified destination, the situational data comprising situational information on the destination area of the vehicle, the situational data being data obtained by the control system prior to the vehicle reaching the specified destination, and the situational data including a plurality of data, the plurality of data including occupant-related data, time of day data, destination-location parameter data, instant social media data related to the destination area, and instant public domain data on the destination area, including any local assemblage data and official situation data on the occupant-specified destination;
      determine a risk level for the occupant to depart the vehicle in the area, the determining being based on the situational data and being representative of a risk to the occupant in departing the vehicle in the area; and
      triggering a safeguard action by the control system based on the determined risk level for the occupant to depart the vehicle in that area, the safeguard action comprising inhibiting by the control system opening of a vehicle door based on the risk level exceeding a defined threshold, and the safeguard action comprising providing, by the control system, the occupant with an alternate destination area to depart the vehicle based on the risk level exceeding the defined threshold for the occupant to depart the vehicle at the destination area, the providing occurring prior to the vehicle reaching the specified destination.

* * * * *